US011283775B2

(12) United States Patent
Ranganathan et al.

(10) Patent No.: US 11,283,775 B2
(45) Date of Patent: Mar. 22, 2022

(54) SYSTEMS AND METHODS FOR ESTABLISHING SECURE REMOTE CONNECTIONS TO MEDIA DEVICES

(71) Applicant: Sling Media PVT Ltd, Bangalore (IN)

(72) Inventors: Gopikumar Ranganathan, Madurai (IN); Rakesh Eluvan Periyaeluvan, Madurai (IN); Ranjith Rajan, Bangalore (IN)

(73) Assignee: Sling Media PVT Ltd, Bangalore (IN)

( * ) Notice: Subject to any disclaimer, the term of this patent is extended or adjusted under 35 U.S.C. 154(b) by 399 days.

(21) Appl. No.: 16/374,368

(22) Filed: Apr. 3, 2019

(65) Prior Publication Data

US 2020/0322317 A1 Oct. 8, 2020

(51) Int. Cl.

| | |
|---|---|
| *H04L 29/06* | (2006.01) |
| *H04N 21/64* | (2011.01) |
| *H04N 21/647* | (2011.01) |
| *H04L 9/32* | (2006.01) |
| *G06F 11/07* | (2006.01) |
| *G06F 9/4401* | (2018.01) |
| *H04L 67/141* | (2022.01) |

(52) U.S. Cl.
CPC ........ *H04L 63/0428* (2013.01); *G06F 9/4416* (2013.01); *G06F 11/0709* (2013.01); *G06F 11/0778* (2013.01); *H04L 9/321* (2013.01); *H04L 67/141* (2013.01); *H04N 21/64* (2013.01); *H04N 21/647* (2013.01)

(58) Field of Classification Search
CPC ... H04L 63/0428; H04L 9/321; H04L 67/141; H04L 63/168; H04L 63/029; H04L 9/3271; H04L 67/08; H04N 21/64; H04N 21/647; G06F 11/0709; G06F 11/0778; G06F 9/4416

See application file for complete search history.

(56) References Cited

U.S. PATENT DOCUMENTS

| | | | | |
|---|---|---|---|---|
| 8,806,037 | B1 * | 8/2014 | Kalra | H04L 41/028 709/229 |
| 2004/0123271 | A1 * | 6/2004 | Bindewald | G06F 11/362 717/124 |
| 2006/0195894 | A1 * | 8/2006 | Nita | G06F 11/3664 726/11 |
| 2007/0180081 | A1 * | 8/2007 | Okmianski | H04L 29/1249 709/223 |
| 2019/0138430 | A1 * | 5/2019 | Smiljanic | G06F 11/3664 |

* cited by examiner

*Primary Examiner* — Trong H Nguyen
(74) *Attorney, Agent, or Firm* — Seed IP Law Group LLP (57) ABSTRACT

Systems and methods for establishing secure remote connections to media devices establish a secure shell (SSH) connection between two machines which are located in two different private networks, such as between a remote debugging computer and a receiving device. The receiving device has a persistent outbound connection with a message server. The remote debugging computer connects to a relay manager and obtains a relay instance IP address and port. The relay manager then forwards the relay instance IP address and port to the receiving device via the message server. After receiving the connection request from the message server, the receiving device connects to the relay instance IP and port and waits for the input data. The remote debugging computer performs an SSH handshake and the receiving device directly authenticates the SSH connection.

21 Claims, 5 Drawing Sheets

SYSTEMS AND METHODS FOR ESTABLISHING SECURE REMOTE CONNECTIONS TO MEDIA DEVICES

TECHNICAL FIELD

The disclosure relates to establishing secure remote connections and, particularly, to establishing secure remote connections to media devices.

BRIEF SUMMARY

Media devices, such as set-top boxes and other connected media players (referred to herein as receiving devices) may stop operating or operate incorrectly due to a system malfunction, software error, customer error or other reason, at which point it is helpful to provide customer assistance immediately to the customer operating the device in order to troubleshoot and resolve the problem quickly and efficiently. In such a case, it is important for the entity providing technical assistance to obtain information regarding operation of the device remotely in real time in order to resolve the problem and remotely perform debugging of the system. However, the device that needs debugging and the remote debugging system may be located in different private networks, and the device may be located behind a firewall or other network security which makes it difficult to obtain such information in an efficient and timely manner. In order to solve this technical problem, establishing a secure remote connection to and performing remote debugging of the device, even when the device and the remote debugging system are located on different private networks, is shown and described herein.

In particular, the present disclosure provides systems, methods and the supporting architectural design to establish a successful secure live remote debugging connection even if a media device is located in a different private network and/or behind a firewall. With this improved architecture, a secure live connection may be possible between any two different private networks in the world.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
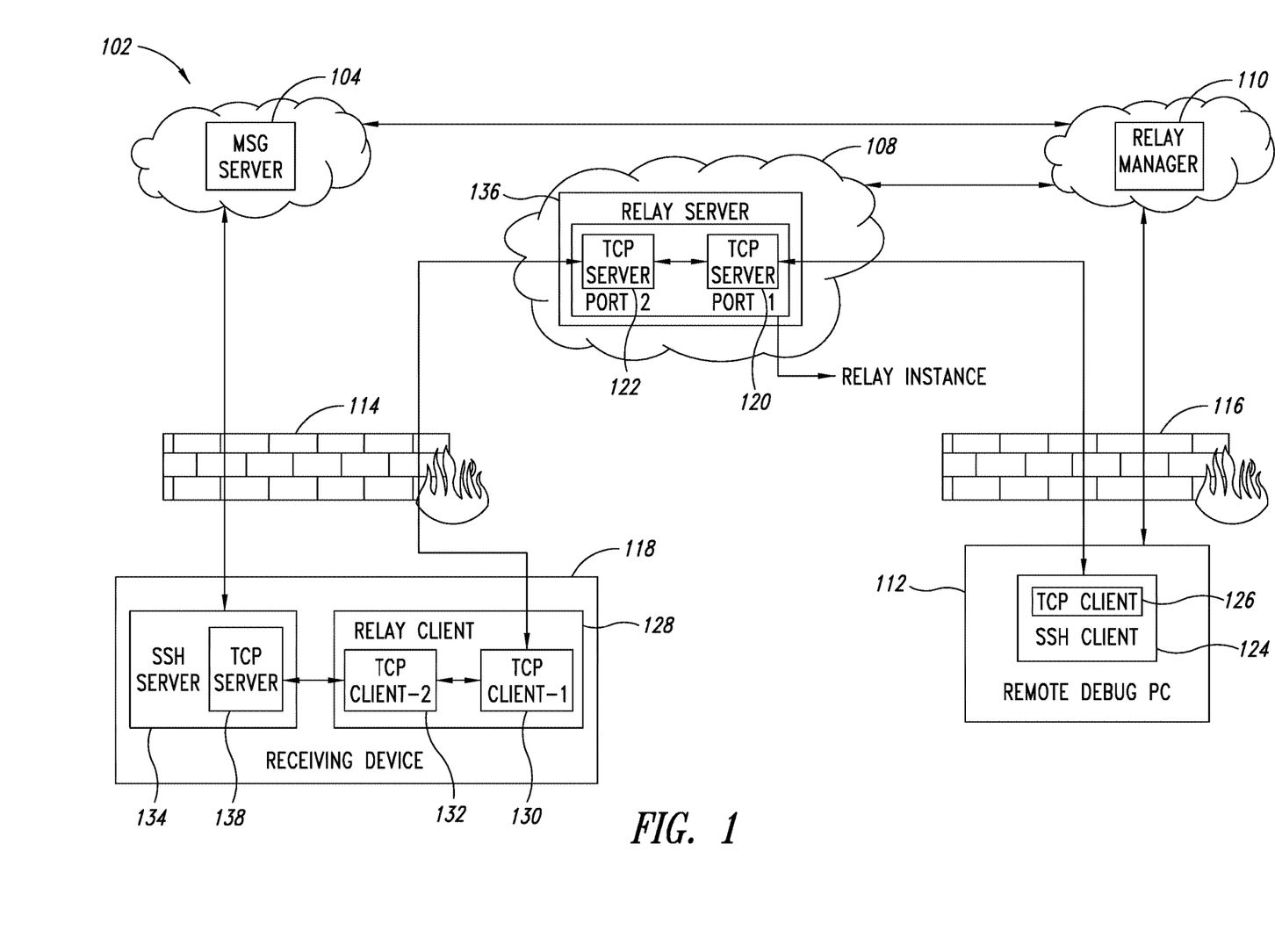
FIG. 1 is an overview block diagram illustrating an example environment in which embodiments of establishing secure remote connections to media devices may be implemented, according to one example embodiment.

FIG. 1 is an overview block diagram illustrating an example environment 102 in which embodiments of establishing secure remote connections to media devices may be implemented, according to one example embodiment.

Before providing additional details regarding the operation and constitution of methods and systems for establishing secure remote connections to media devices, the example environment 102, within which such a system may operate, will briefly be described. In the environment 102, audio, video, and/or data service providers, such as television service providers, provide their customers a multitude of video and/or data programming (hereafter, collectively and/or exclusively "programming"). Such programming is often provided by use of a receiving device 118 (interchangeably referred to herein as "box" or "machine", such as the receiving device 118 shown in FIG. 1) configured to receive the programming and communicatively coupled directly or indirectly to a presentation device (not shown). The programming may include any type of media content, including, but not limited to: television shows, news, movies, sporting events, documentaries, advertisements, web videos, media clips, etc., in various formats including, but not limited to: standard definition, high definition, 4 k Ultra High-Definition (HD), Ultra HD (UHD), AVI (Audio Video Interleave), FLV (Flash Video Format), WMV (Windows Media Video), MOV (Apple QuickTime Movie), MP4 (Moving Pictures Expert Group 4), WAV (Waveform Audio File Format), MP3 (Moving Picture Experts Group Layer-3 Audio), WMA (Windows Media Audio), PCM (Pulse-Code Modulation), AIFF (Audio Interchange File Format), AAC (Advanced Audio Coding), LPCM (Linear pulse code modulation), and OGG (Vorbis).

The receiving device 118 may interconnect to one or more communications media, sources or other devices (such as a cable head-end, satellite antenna, telephone company switch, Ethernet portal, off-air antenna, other receiving devices, or the like) that provide the programming. The receiving device 118 commonly receives a plurality of programming by way of the communications media or sources. Based upon selection by a user, the receiving device 118 processes and communicates the selected programming to the presentation device.

For convenience, examples of a receiving device may include, but are not limited to, devices such as: a "media device", "media player," "streaming media player," "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to play back programming. Further, the receiving device 118 itself may include user interface devices, such as buttons or switches. In many applications, a remote-control device ("remote", not shown) is operable to control the receiving device and/or the presentation device. The remote typically communicates with the receiving device 118 using a suitable wireless medium, such as infrared ("IR"), radio frequency ("RF"), or the like.

Examples of a presentation device may include, but are not limited to: a television ("TV"), a mobile device, a smartphone, a tablet device, a personal computer ("PC"), a sound system receiver, a digital video recorder ("DVR"), a Digital Video Disc ("DVD") device, game system, or the like. Presentation devices may employ a display, one or more speakers, and/or other output devices to communicate video and/or audio content to a user. In many implementations, one or more presentation devices are communicatively coupled, directly or indirectly, to the receiving device 118. Further, the receiving device and the presentation device may be integrated into a single device. Such a single device may have the above-described functionality of the receiving device 118 and the presentation device, or may even have additional functionality.

It may occur that the receiving device 118 stops operating or operates incorrectly due to a system malfunction, software error, customer error or other reason, at which point it is helpful to provide customer assistance immediately to the customer operating the receiving device 118 in order to troubleshoot and resolve the problem quickly and efficiently. In such a case, it is important for the entity providing technical assistance to obtain information regarding operation of the receiving device 118 remotely in real time in order to obtain the current state of the receiving device, resolve the problem and remotely perform debugging, if necessary, of the receiving device system. However, the receiving device 118 is often located in a different private network than the remote debugging computer (or device of the entity providing technical assistance) and/or located behind a firewall 114 or other network security. This makes it difficult to obtain such information in an efficient and timely manner.

The architectural design to establish secure remote connections to the receiving device 118 or other media devices, even when they are located in a different private network than the remote debugging computer (such as remote debug PC 112) of the entity providing technical assistance and/or when such devices are located behind a firewall, such as firewall 114 and firewall 116, is shown in FIG. 1 and described herein. The receiving device 118 may have already established a persistent connection with a message (MSG) server 104. The MSG server connection is an outbound connection established by the receiving device 118. Since it is an outbound connection, it connects across firewall restrictions, including firewall 114.

The system establishes a secure shell (SSH) connection between two machines which are located in two different private networks, such as remote debug PC 112 and the receiving device 118 and/or located behind firewalls, such as firewall 114 and firewall 116. This connection may be an SSH connection made via a terminal emulator, serial console and/or network file transfer application or client, such as PuTTy. Such a client may support several network protocols, including Secure Copy Protocol (SCP), SSH, Telnet, rlogin, and raw socket connection. It can also connect to a serial port. In other embodiments, other types of secure protocol or connections may be made via a terminal emulator, serial console or network file transfer application or client.

In the present example embodiment, the receiving device 118 has a persistent connection with the MSG server 104. The remote debug PC 112 connects to the relay manager 110 and obtains a relay instance IP address and port. The relay manager 110 then forwards the relay instance IP address and port to the receiving device 118 (via the MSG server 104).

After receiving the connection request from the MSG server 104, the TCP Client-1 130 of the relay client 128 of the receiving device 118 connects to the relay instance IP and port and waits for the input data (e.g., via <Public IP>:Port 2 of the TCP server 122 of the relay server 136). The remote debug PC 112 (e.g., via PuTTy) connects to the relay instance IP address and port (e.g., via <Public IP>:Port 1 of the TCP server 120 of the relay server 136) and performs an SSH handshake. The relay instance forwards the entire data to the receiving device 118 (in the present example embodiment, even if the data is SSH handshake data without consuming it).

TCP Client-1 130 receives the data and forwards it to TCP-Client-2 132. TCP Client-2 132, once receiving the data, immediately connects to the local SSH server 134 via the TCP server 138 of the SSH server 134. The SSH server 134 directly authenticates the SSH connection from the receiving device 118. In the present embodiment, where the connection may be via PuTTy from a PC to any private network receiving devices, the remote debug PC 112 may be be directly prompted with an SSH password banner, where the user can directly enter the password and login to the receiving device 118 and get full access to the receiving device 118.

The system shown in FIG. 1 and described herein may perform various operations and collection of various information, including, but not limited to:

1. Performing debugging in real time for any end-user-complaint.
2. Performing tcpdump (dump the network trace and sending the data to the debug sever via SFTP/SCP connections)
3. Collection of CPU/RAM utilization information
4. Understanding the real state of the receiving device 118.
5. Understanding the end-user network topology.
6. Pulling out any debug files required from the receiving device 118.
7. Rebooting the receiving device 118.
8. Editing/changing the configuration of the receiving device 118.
9. The method described herein will work even if the devices, such as the receiving device 118 and the remote debug PC 112, are connected to routers which do not support port forwarding, etc.

The devices shown in FIG. 1 may communicate over a Network 108. The Network 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. The Network 108 may include any telecommunications network, computer network, or combination of telecommunications and computer networks that enables applicable communication between the various devices connected to the communication system shown in the diagram above. For example, a communications network of Network 108 may include a wide area network (WAN) that communicates over many miles or local area network (LAN) that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in the diagram above. Thus, systems shown in FIG. 1 may have various applicable wireless transmitters and receivers and, in the case of using a Wi-Fi wireless link, may also have the corresponding executable Wi-Fi compatible network communications software that initiates, controls, maintains or manages the wireless link between the systems shown in the diagram above and the various other devices and systems within or Network 108 over the Wi-Fi signal of communication system.

The Network 108 may comprise connections to the systems shown in FIG. 1 that provide services to the systems shown in FIG. 1, and may itself represent multiple interconnected networks. For instance, wired and wireless enterprise-wide computer networks, intranets, extranets, and/or the Internet may be included in or comprise a part of Network 108. Embodiments may include various types of communication networks including other telecommunications networks, cellular networks and other mobile networks. There may be any variety of computers, switching devices, routers, bridges, firewalls, edge devices, multiplexers, phone lines, cables, telecommunications equipment and other devices within communication system and/or in the communications paths between the receiving device 118 and other devices shown in FIG. 1. Some or all of such equipment of communication system may be owned, leased or controlled by third-party service providers.

In accordance with an aspect of the disclosure, the receiving device 118, MSG server 104, remote debug PC 112, relay manager 110 and/or relay server 136 may contain discrete functional program modules that might make use of an application programming interface (API), or other object, software, firmware and/or hardware, to request services of each other (e.g., message services, debugging services and information requests) and/or one or more of the other entities within or connected to the Network 108.

For example, communication can be provided over a communications medium, e.g., client and server systems running on any of the receiving device 118 or other devices shown in FIG. 1. These client and server systems may be coupled to one another via transmission control protocol/internet protocol (TCP/IP) connection(s) for high-capacity communication. The "client" is a member of a class or group that uses the services (e.g., message services and/or debug data upload services) of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. In the example in the FIG. 1, the receiving device 118 and/or Remote Debug PC 112 may be a client requesting the services of the Message Server 104 and/or Debug Data Upload Server 110 acting as server(s). However, any entity in the diagram above, including the receiving device, can be considered a client, a server, or both, depending on the circumstances.

One or more cellular towers and stations may be part of a cellular network that is part of the Network 108 and may be communicatively linked by one or more communications networks or communication mediums within the Network 108 (e.g., using a cellular or other wired or wireless signal) in order to facilitate sending and receiving information in the form of synchronous or asynchronous data. This communication may be over a wireless signal on the cellular network of communication system using applicable combinations and layers of telecommunications and networking protocols and standards such as fourth generation broadband cellular network technology (4G), Long Term Evolution (LTE), HTTP and TCP/IP, etc.

Although the physical aspects of environment 102, including the receiving device 118, MSG server 104, remote debug PC 112, relay manager 110 and/or relay server 136, may have connected devices such as computers, the physical environment may alternatively have or be described as comprising various digital devices such as smartphones, tablets, personal digital assistants (PDAs), televisions, MP3 players, etc.; software objects such as interfaces, Component Object Model (COM) objects; and the like.

There are a variety of systems, components, and network configurations that may also support distributed computing and/or cloud-computing environments within the communication system. For example, computing systems may be connected together within the Network 108 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of Network 108.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network such as communication system. In a distributed computing environment, program modules may be located in both local and remote memory storage devices.

Figure 2:
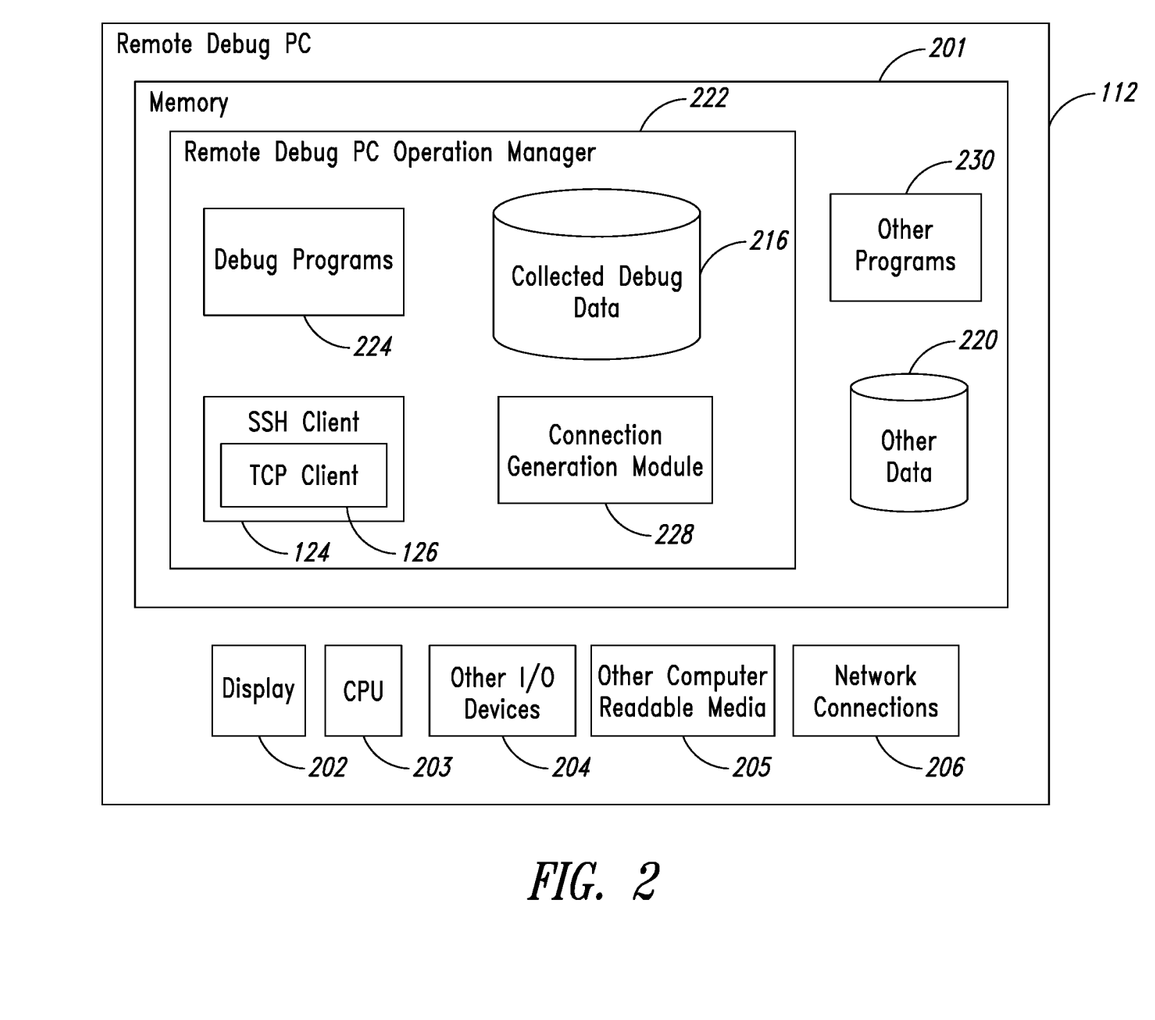
FIG. 2 is a block diagram illustrating elements of an example remote debug PC used in establishing secure remote connections to media devices, according to an example embodiment.

FIG. 2 is a block diagram illustrating elements of an example remote debug PC 112 used in establishing secure remote connections to media devices, according to one example embodiment. In various embodiments, some or all of the components, modules, connections, operation and functionality, or equivalents thereto, of the Remote Debug PC 112 shown in FIG. 1 and/or described herein may also or instead, as applicable, be that of the receiving device 118, MSG server 104, relay manager 110 and/or relay server 136 shown in FIG. 1 and perform the functionality of those devices as described herein.

The Remote Debug PC 112 may facilitate providing technical assistance by establishing a secure remote connection to the receiving device 118, even when the receiving device 118 is located in a different private network than the remote debug PC 112, obtaining information regarding operation of the receiving device 118 remotely in real time in order to resolve problems experienced by the receiving device 118 and remotely performing debugging of the receiving device system 118. The receiving device 118 is often located in a different private network than the remote debug PC 112 and/or behind a firewall 114 or other network security which makes it difficult to obtain such information in an efficient and timely manner. However, the present disclosure provides an improvement in the technology of computer system and media device operation in that it a utilizes a persistent connection with Message Server 104, a relay server 136 and a relay manager 110 to establish a secure remote connection to the receiving device 118 and send commands to be performed by the receiving device 118 for troubleshooting and debugging purposes across such network security measures and to access information from the receiving device that may be used for debugging, even when the receiving device 118 is located in a different private network than the remote debug PC 112 and/or behind a firewall 114 or other network security.

Note that one or more general purpose or special purpose computing systems/devices may be used as part of or in conjunction with the remote debug PC 112 to connect to relay manager 110; receive, via the connection to the relay manager 110, a relay instance IP address and port; and connect to the relay instance IP address and port using the TCP Client 126 of the SSH client 124 of the remote debug PC operation manager 222. This is performed via the relay server 108 that is in communication with the relay manager 110. The receiving device 118 is also connected to the relay instance IP address and port that was forwarded to the receiving device 118 via a persistent outbound connection previously established by the receiving device 118 to MSG server 104 in communication with the relay manager 110. One or more general purpose or special purpose computing systems/devices may be used as part of or in conjunction with the remote debug PC 112 to perform a secure shell (SSH) cryptographic handshake with the SSH server 134 of the receiving device 118 via the relay instance IP address and port and establish an SSH connection to the receiving device 118 as a result of the performing the SSH cryptographic handshake.

In addition, in some embodiments, the Remote Debug PC 112 may comprise one or more distinct computing systems/devices and may span distributed locations. Furthermore, each block shown may represent one or more such blocks as appropriate to a specific embodiment or may be combined with other blocks. Also, the remote debug PC operation manager 222 may be implemented in software, hardware, firmware, or in some combination to achieve the capabilities described herein.

In the embodiment shown, Remote Debug PC 112 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, other communication ports, and the like), other computer-readable media 205 and network connections 206. The remote debug PC operation manager 222 is shown residing in memory 201. In other embodiments, some portion of the contents and some, or all, of the components of the remote debug PC operation manager 222 may be stored on and/or transmitted over the other computer-readable media 205. The components of the Remote Debug PC 112 and operation manager 222, including the connection generation module 228 utilizing the SSH client 124, preferably execute on one or more CPUs 203 and facilitate connecting to relay manager 110; receiving, via the connection to the relay manager 110, a relay instance IP address and port; and connecting to the relay instance IP address and port using the TCP Client 126 of the SSH client 124 of the remote debug PC operation manager 222. This is performed via the relay server 108 that is in communication with the relay manager 110. The components of the Remote Debug PC 112 and operation manager 222, including the connection generation module 228 utilizing the SSH client 124, preferably execute on one or more CPUs 203 and facilitate the receiving device 118 connecting to the relay instance IP address and port that was forwarded to the receiving device 118 via a persistent outbound connection previously established by the receiving device 118 to MSG server 104 in communication with the relay manager 110. The components of the Remote Debug PC 112 and operation manager 222, including the connection generation module 228 utilizing the SSH client 124, preferably execute on one or more CPUs 203 and facilitate performing a secure shell (SSH) cryptographic handshake with the SSH server 134 of the receiving device 118 via the relay instance IP address and port and establishing an SSH connection to the receiving device 118 as a result of the performing the SSH cryptographic handshake.

Performance of debugging and analysis to perform debugging and troubleshooting of the receiving device 118 may be performed by execution of debug programs 224 of the remote debug PC operation manager 222. Such performance of debugging and analysis may be based on the output from the receiving device 118 resulting from execution of the debug programs (either locally or remotely on the receiving device 118) and other pertinent data from the receiving device 118 stored in collected debug data storage repository 216. Various debug programs 224 may cause commands to be sent to the receiving device 118 via a connection established by a connection generation module 228. The connection may be a persistent outbound connection from the receiving device 118 to the MSG server 104 across different private networks and restrictions of the firewall 114 and firewall 116. Such commands sent to the receiving device 118 that may comprise the debug programs 224 may include, but are not limited to: dump a file output, reboot the receiving device 118, dump the network trace (e.g., tcpdump).

Other code or programs 230 (e.g., further data processing modules, a user interface manager module, a Web server, and the like), and potentially other data repositories, such as other data repository 220 for storing other data (receiving device profiles, customer or user profiles, troubleshooting and debugging standards, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the remote debug PC 118 and operation manager 222 include an application program interface ("API") that provides programmatic access to one or more functions of the Remote Debug PC 112 and operation manager 222. For example, such an API may provide a programmatic interface to one or more functions of the Remote Debug PC operation manager 222 that may be invoked by one of the other programs 230; one or more devices shown in FIG. 1, such as the receiving device 118, MSG server 104, relay manager 110 and/or relay server 136 shown in FIG. 1. In this manner, the API may facilitate the development of third-party software, such as various different service applications, user interfaces, plug-ins, adapters (e.g., for integrating functions of the Remote Debug PC operation manager into desktop applications), and the like to facilitate establishing secure remote connections to media devices using the remote debug PC 112 and other remote devices.

In an example embodiment, components/modules of the remote debug PC 112 and remote debug PC operation manager 222 are implemented using standard programming techniques. For example, the remote debug PC operation manager 222 may be implemented as a "native" executable running on the CPU 203, along with one or more static or dynamic libraries. In other embodiments, the remote debug PC 112 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the remote debug PC 112 to perform the functions of the remote debug PC operation manager 222. In one embodiment, instructions cause the CPU 203 or some other processor, such as an I/O controller/processor, to connect to relay manager 110; receive, via the connection to the relay manager 110, a relay instance IP address and port; and connect to the relay instance IP address and port using the TCP Client 126 of the SSH client 124 of the remote debug PC operation manager 222. This is performed via the relay server 108 that is in communication with the relay manager 110. The receiving device 118 is also connected to the relay instance IP address and port that was forwarded to the receiving device 118 via a persistent outbound connection previously established by the receiving device 118 to MSG server 104 in communication with the relay manager 110. Instructions stored in a memory also configure, when executed, one or more processors of the remote debug PC 112 to perform a secure shell (SSH) cryptographic handshake with the SSH server 134 of the receiving device 118 via the relay instance IP address and port and establish an SSH connection to the receiving device 118 as a result of the performing the SSH cryptographic handshake.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by remote debug PC operation manager 222 implementation. Also, other functions could be implemented and/or performed by each component/module, and in different orders, and by different components/modules, yet still achieve the functions of the remote debug PC 112 and remote debug PC operation manager 222.

In addition, programming interfaces to the data stored as part of the remote debug PC 112 and operation manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The collected debug data storage repository 216 and other data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the remote debug PC operation manager 222.

Furthermore, in some embodiments, some or all of the components of the remote debug PC 112 and remote debug PC operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

In an example where the CPU 203 is part of the receiving device 118, in one embodiment, instructions cause the CPU 203 or some other processor, such as an I/O controller/processor, to receive, forwarded from relay manager 110 in communication with remote debug PC 112 that is located in a different private network than the receiving device 118, an SSH connection request at the local SSH server 134 of the receiving device 118, the connection request including a relay instance IP address and port and received via MSG server 104 over a persistent outbound connection previously established by the receiving device 118 to the MSG server 104 in communication with the relay manager 110, wherein the remote debug PC 112 is connected to the relay instance IP address and port that was forwarded to the receiving device 118; connect, by TCP Client-1 130 of a relay client 128 of the receiving device 118, to the relay instance IP address and port in response to the SSH connection request and wait for input data; receive, by the TCP Client-1 130 of the relay client 128 of the receiving device 118, forwarded from relay server 136 in communication with the remote debug PC 112, SSH handshake data from the remote debug PC 112; forward, by the TCP Client-1 130 of the relay client 128 of the receiving device 118, the SSH handshake data to a TCP Client-2 132 of the relay client 128 of the receiving device 118; connect, by TCP Client-2 132 of the relay client 128 of the receiving device 118, to the local SSH server 134 of the receiving device 118 in response to being forwarded the SSH handshake data; and authenticate, by the local SSH server 134 of the receiving device 118, an SSH connection to the SSH client 124 of the remote debug PC 112 based on the forwarded SSH handshake data.

Figure 3:
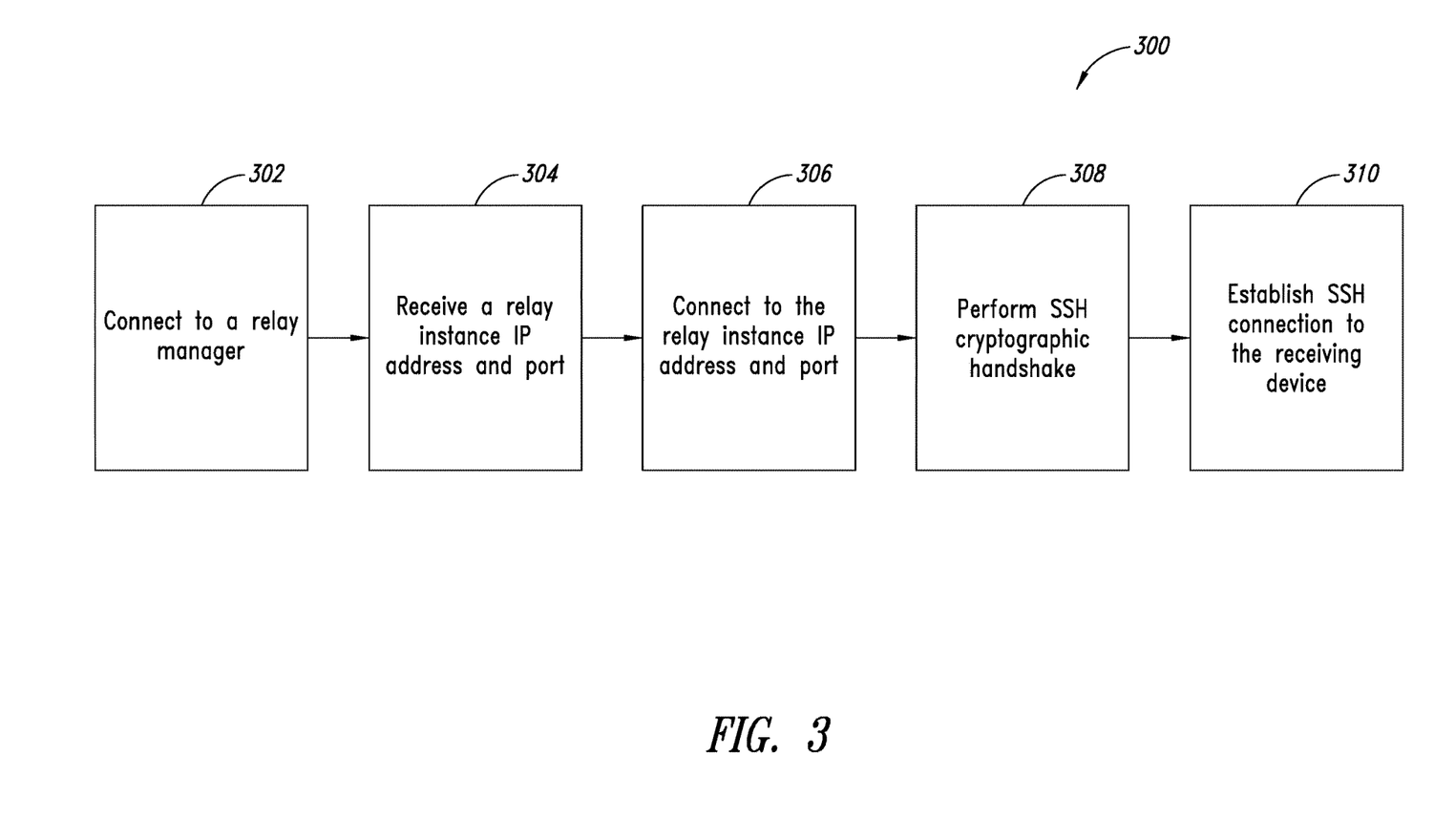
FIG. 3 is a flow diagram of an example method for establishing secure remote connections to media devices that may be performed by the remote debug PC, according to an example embodiment.

FIG. 3 is a flow diagram of an example method 300 for establishing secure remote connections to media devices that may be performed by the remote debug PC 112, according to one example embodiment.

At 302, the remote debug PC 112 connects to relay manager 110 by a remote debug PC that is remote from receiving device 118 and located in a different private network than the receiving device 118.

At 304, the remote debug PC 112 receives, via the connection to the relay manager 110, a relay instance internet protocol (IP) address and port.

At 306, the remote debug PC 112 connects to the relay instance IP address and port via relay server 136 that is in communication with the relay manager 110. The receiving device 118 is also connected to the relay instance IP address and port that was forwarded to the receiving device 118 via a persistent outbound connection previously established by the receiving device 118 to MSG server 104 in communication with the relay manager 110.

At 308, the remote debug PC 112 performs an SSH cryptographic handshake with the SSH server 134 of the receiving device 118 via the relay instance IP address and port.

At 310, the remote debug PC 112 establishes an SSH connection to the receiving device 118 as a result of the performing the SSH cryptographic handshake.

Figure 4:
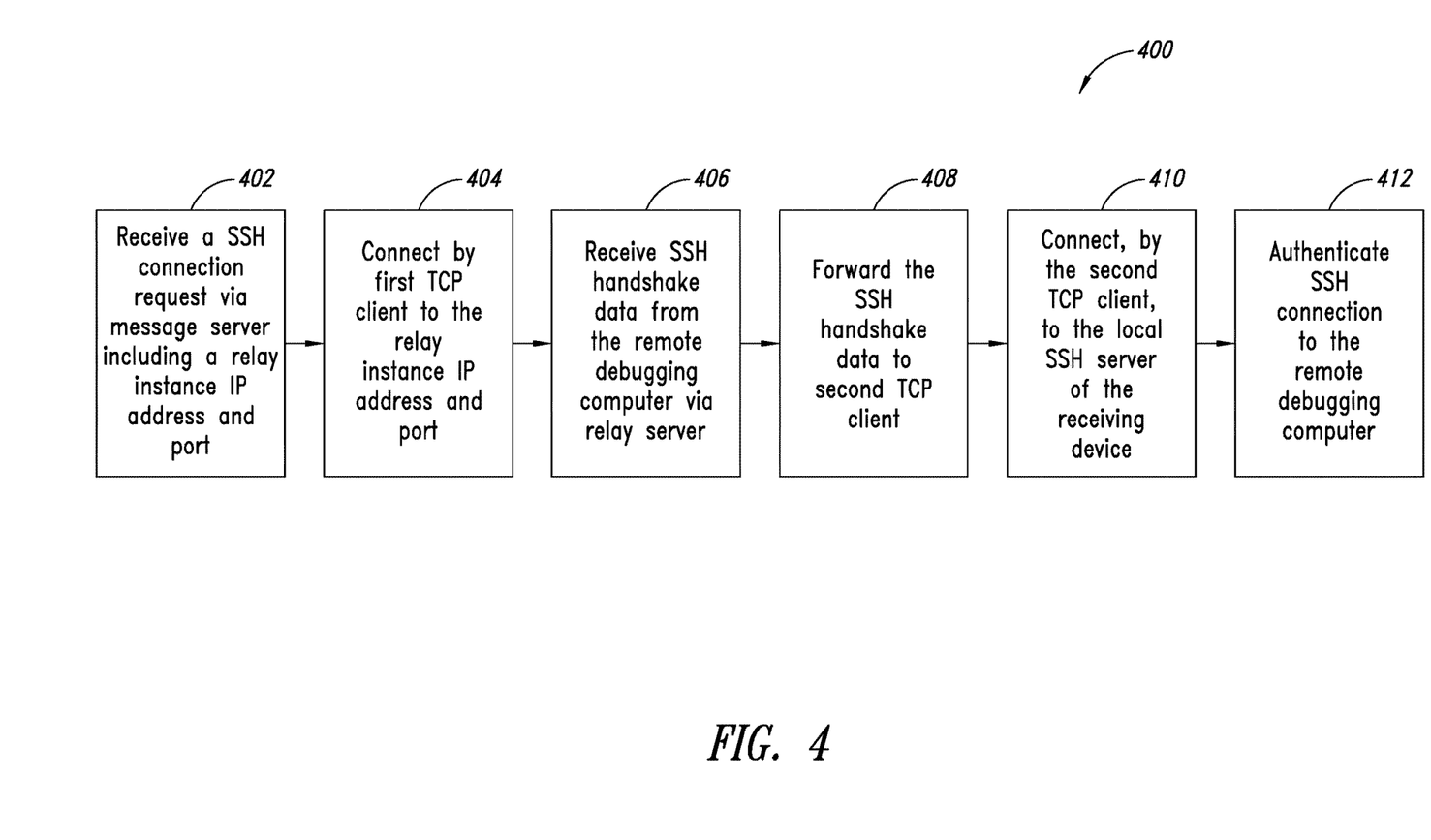
FIG. 4 is a flow diagram of an example method for establishing secure remote connections to media devices that may be performed by the receiving device, according to an example embodiment.

FIG. 4 is a flow diagram of an example method 400 for establishing secure remote connections to media devices that may be performed by the receiving device 118, according to one example embodiment.

At 402, the receiving device 118, receives, forwarded from relay manager 110 in communication with remote debug PC 112 that is located in a different private network than the receiving device 118, an SSH connection request at local SSH server 134 of the receiving device 118. The connection request includes a relay instance IP address and port and is received via MSG server 104 over a persistent outbound connection previously established by the receiving device 118 to the MSG server 104 in communication with the relay manager 110. The remote debug PC 112 is connected via the relay instance IP address and port that was forwarded to the receiving device 118.

At 404, the receiving device 118 connects, by TCP Client-1 130 of relay client 128 of the receiving device 118, to the relay instance IP address and port in response to the SSH connection request and waits for input data.

At 406, the receiving device 118, receives, by TCP Client-1 130 of relay client 128 of the receiving device 118, forwarded from relay server 136 in communication with the remote debug PC 112, SSH handshake data from remote debug PC 112.

At 408, the receiving device 118 forwards, by TCP Client-1 130 of relay client 128 of the receiving device 118, the SSH handshake data to TCP Client-2 132 of relay client 128 of the receiving device 118.

At 410, the receiving device 118 connects, by TCP Client-2 132 of relay client 128 of the receiving device 118, to the local SSH server 134 of the receiving device 118 in response to being forwarded the SSH handshake data.

At 412, the receiving device 118 authenticates, by the local SSH server 134 of the receiving device 118, an SSH connection to the SSH client 124 of the remote debug PC 112 based on the forwarded SSH handshake data.

Figure 5:
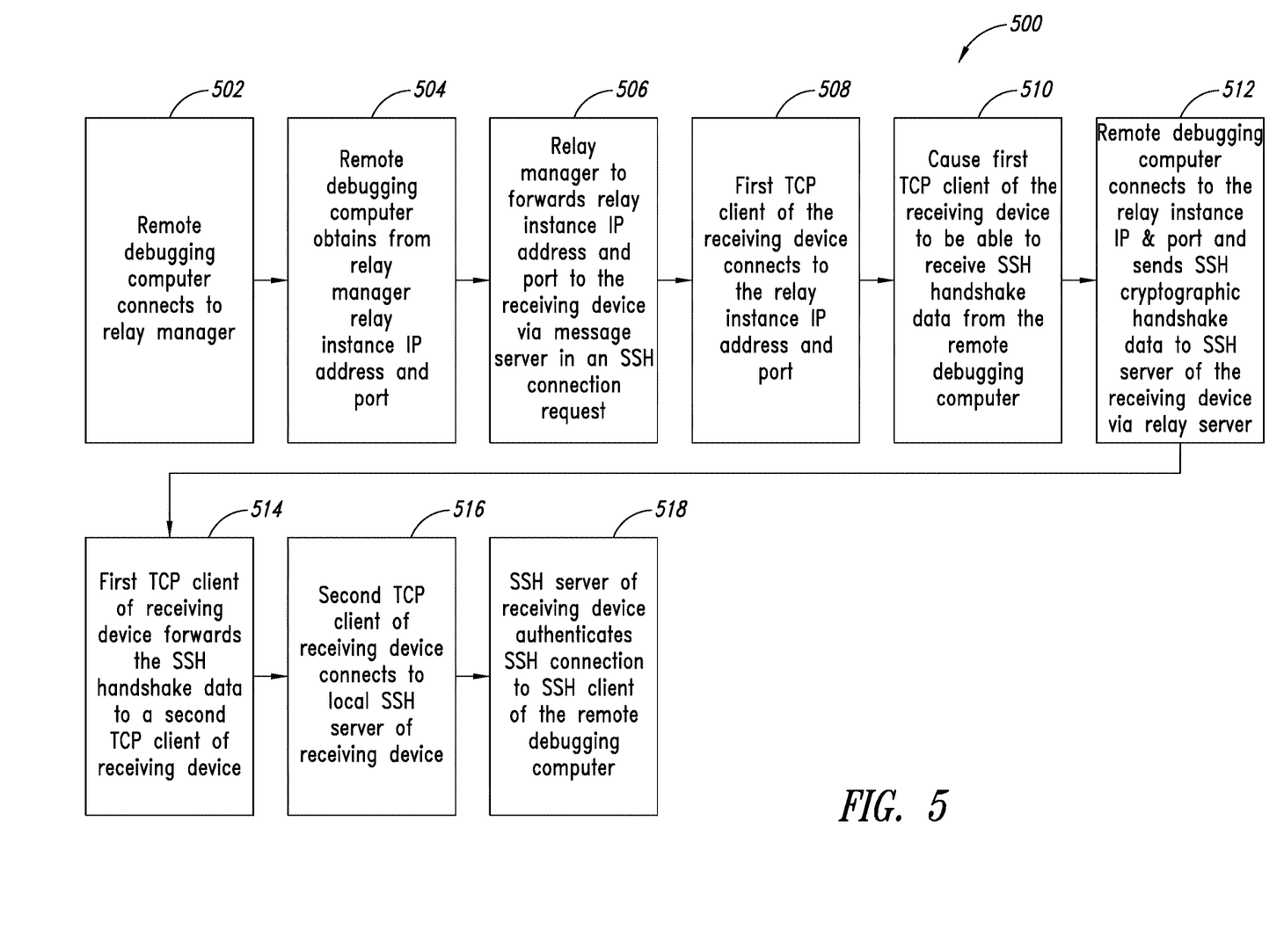
FIG. 5 is a flow diagram of an example method for establishing secure remote connections to media devices from the perspective of the overall system for establishing secure remote connections to media devices, according to an example embodiment.

FIG. 5 is a flow diagram of an example method 500 for establishing secure remote connections to media devices from the perspective of the overall system for establishing secure remote connections to media devices, according to one example embodiment.

At 502, the system causes the remote debug PC 112 that is remote from receiving device 118 and located in a different private network than the receiving device 118 to connect to relay manager 110.

At 504, the system causes the remote debug PC 112 to obtain, via the connection to the relay manager 110, a relay instance internet protocol (IP) address and port.

At 506, the system causes the relay manager 110 to forward the relay instance IP address and port to the receiving device 118 in an SSH connection request sent to the local SSH server 134 of the receiving device 118 via MSG server 104 over a persistent outbound connection previously established by the receiving device 118 to MSG server 104 in communication with the relay manager 110.

At 508, the system causes TCP Client-1 130 of the relay client 128 of the receiving device 118 to connect to the relay instance IP address and port in response to the SSH connection request and to wait for input data.

At 510, the system causes TCP Client-1 130 of the relay client 128 of the receiving device 118 to be able to receive SSH handshake data from the remote debug PC 112 forwarded from the relay server 136 in communication with the remote debug PC 112.

At 512, the system causes the remote debug PC 112 to connect to the relay instance IP and port and to send SSH cryptographic handshake data to the SSH server 134 of the receiving device 118 via the relay instance IP address and port.

At 514, the system causes TCP Client-1 130 of the relay client 128 of the receiving device 118 to forward the SSH handshake data to TCP Client-2 132 of the relay client 128 of the receiving device 118.

At 516, the system causes TCP Client-2 132 to connect to the local SSH server 134 of the receiving device 118 in response to being forwarded the SSH handshake data.

At 518, the system causes the local SSH server 134 of the receiving device 118 to authenticate an SSH connection to the SSH client 124 of the remote debug PC 112 based on the forwarded SSH handshake data. The system may also cause the receiving device 118 to establish the persistent outbound connection to the MSG server 104 in communication with the relay manager 110 before receiving the SSH connection request at the local SSH server 134 of the receiving device 118.

While various embodiments have been described herein above, it is to be appreciated that various changes in form and detail may be made without departing from the spirit and scope of the invention(s) presently or hereafter claimed.

The invention claimed is:

1. A method for establishing secure remote connections to media devices, the method comprising:
connecting, over a computer network, to a relay manager by a remote debugging computer that is remote from a receiving device and located in a different private network than the receiving device;
receiving, via the connection to the relay manager, a relay instance internet protocol (IP) address and port;
connecting, over a computer network by the remote debugging computer, to the relay instance IP address and port via a relay server that is in communication with the relay manager, wherein the receiving device is also connected to the relay instance IP address and port that was forwarded to the receiving device via a persistent outbound connection previously established by the receiving device to a message server in communication with the relay manager;

performing, over a computer network by the remote debugging computer, a secure shell (SSH) cryptographic handshake with an SSH server of the receiving device via the relay instance IP address and port; and establishing, by the remote debugging computer an SSH connection to the receiving device as a result of the performing the SSH cryptographic handshake.

2. The method of claim 1 wherein the establishing the SSH connection to the receiving device further includes:

receiving, by the remote debugging computer, a prompt with an SSH password banner; and enabling, by the remote debugging computer, access to the receiving device using the remote debugging computer via receiving input comprising login credentials in response to the prompt.

3. The method of claim 1 wherein the SSH connection to the receiving device is made via a secure remote terminal emulator.

4. The method of claim 3 wherein the secure remote terminal emulator is PuTTy.

5. The method of claim 1 wherein the receiving device is located behind a computer network firewall.

6. The method of claim 1, further comprising:

receiving an end-user complaint regarding the receiving device;

performing, with the remote debugging computer, debugging of the receiving device to address the end-user complaint over the SSH connection to the receiving device via the relay server.

7. The method of claim 1, further comprising:

initiating, by the remote debugging computer over the SSH connection to the receiving device, a dump of a network trace and sending of data representing the dump of the network trace to the remote debugging computer.

8. The method of claim 1, further comprising:

collecting, by the remote debugging computer from the receiving device over the SSH connection, central processing unit or memory utilization of the receiving device.

9. The method of claim 1, further comprising:

receiving in real time, by the remote debugging computer from the receiving device over the SSH connection, state information indicative of a current state of the receiving device.

10. The method of claim 1, further comprising:

receiving in real time, by the remote debugging computer from the receiving device over the SSH connection, information indicative of end-user network topology.

11. The method of claim 1, further comprising:

initiating, by the remote debugging computer over the SSH connection to the receiving device, the remote debugging computer receiving debug files from the receiving device.

12. The method of claim 1, further comprising:

initiating, by the remote debugging computer over the SSH connection to the receiving device, rebooting of the receiving device.

13. The method of claim 1, further comprising:

initiating, by the remote debugging computer over the SSH connection to the receiving device, editing of a configuration of the receiving device.

14. The method of claim 1, wherein one or more of the receiving device and the remote debugging computer is connected to a router that does not support port forwarding.

15. A system for establishing secure remote connections to media devices comprising:

at least one processor; and at least one memory coupled to the at least one processor, the at least one memory having instructions thereon that, when executed by the at least one processor, cause a receiving device to:

receive over a computer network, forwarded from a relay manager in communication with a remote debugging computer that is located in a different private network than the receiving device, a secure shell (SSH) connection request at a local SSH server of the receiving device, the SSH connection request including a relay instance internet protocol (IP) address and port and received via a message server over a persistent outbound connection previously established by the receiving device to the message server in communication with the relay manager, wherein the remote debugging computer is connected to the relay instance IP address and port that was forwarded to the receiving device;

connect, by a first transmission control protocol (TCP) client of a relay client of the receiving device, to the relay instance IP address and port in response to the SSH connection request and wait for input data;

receive, by the first TCP client of the relay client of the receiving device, forwarded from a relay server in communication with the remote debugging computer, SSH handshake data from the remote debugging computer;

forward, by the first TCP client of the relay client of the receiving device, the SSH handshake data to a second TCP client of the relay client of the receiving device;

connect, by the second TCP client of the relay client of the receiving device, to the local SSH server of the receiving device in response to being forwarded the SSH handshake data; and authenticate, by the local SSH server of the receiving device, an SSH connection to an SSH client of the remote debugging computer.

16. The system of claim 15 wherein the remote debugging computer is located behind a computer network firewall.

17. The system of claim 15, wherein the instructions, when executed by the at least one processor, further cause the receiving device to:

send an end-user complaint regarding the receiving device to the remote debugging computer via the SSH connection to the SSH client of the remote debugging computer;

receive a command, via the SSH connection to the SSH client of the remote debugging computer, to facilitate debugging of the receiving device to address the end-user complaint; and execute the command to facilitate debugging of the receiving device to address the end-user complaint in response to receiving the command via the SSH connection to the SSH client of the remote debugging computer.

18. The system of claim 17 wherein the command includes a command to perform a dump of a network trace and send data representing the dump of the network trace to the remote debugging computer via the SSH connection to the SSH client of the remote debugging computer.

19. The system of claim 15, wherein the instructions, when executed by the at least one processor, further cause the receiving device to:
  establish the persistent outbound connection to the message server in communication with the relay manager before receiving the SSH connection request at the local SSH server of the receiving device.

20. The system of claim 15, wherein the instructions, when executed by the at least one processor, further cause the receiving device to:
  cause the receiving device to establish the persistent outbound connection to the message server in communication with the relay manager before receiving the SSH connection request at the local SSH server of the receiving device.

21. A non-transitory computer-readable storage medium having computer-executable instructions stored thereon that, when executed, cause at least one processor to:
  cause a remote debugging computer that is remote from a receiving device and located in a different private network than the receiving device to connect to a relay manager;
  cause the remote debugging computer to obtain, via the connection to the relay manager, a relay instance internet protocol (IP) address and port;
  cause the relay manager to forward the relay instance IP address and port to the receiving device in a secure shell (SSH) connection request sent to a local SSH server of the receiving device via a message server over a persistent outbound connection previously established by the receiving device to the message server in communication with the relay manager;
  cause a first transmission control protocol (TCP) client of a relay client of the receiving device to connect to the relay instance IP address and port in response to the SSH connection request and wait for input data;
  cause the first TCP client of the relay client of the receiving device to be able to receive SSH cryptographic handshake data from the remote debugging computer forwarded from a relay server in communication with the remote debugging computer;
  cause the remote debugging computer to send the SSH cryptographic handshake data to an SSH server of the receiving device via the relay instance IP address and port;
  cause the first TCP client of the relay client of the receiving device to forward the SSH cryptographic handshake data to a second TCP client of the relay client of the receiving device;
  cause the second TCP client of the relay client of the receiving device to connect to the local SSH server of the receiving device in response to being forwarded the SSH cryptographic handshake data; and
  cause the local SSH server of the receiving device to authenticate an SSH connection to an SSH client of the remote debugging computer.

\* \* \* \* \*